(12) United States Patent
Lu et al.

(10) Patent No.: US 11,490,031 B2
(45) Date of Patent: Nov. 1, 2022

(54) METHODS AND SYSTEMS FOR IMAGE CAPTURE

(71) Applicant: ZHEJIANG DAHUA TECHNOLOGY CO., LTD., Zhejiang (CN)

(72) Inventors: Erli Lu, Hangzhou (CN); Jun Zhao, Hangzhou (CN); Naiying Ding, Hangzhou (CN); Mingzhu Chen, Hangzhou (CN); Zhiyong Xu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 221 days.

(21) Appl. No.: 16/824,967

(22) Filed: Mar. 20, 2020

(65) Prior Publication Data
US 2020/0221037 A1    Jul. 9, 2020

Related U.S. Application Data

(63) Continuation of application No. PCT/CN2018/107035, filed on Sep. 21, 2018.

(30) Foreign Application Priority Data

Sep. 22, 2017 (CN) .......................... 201710864066.9

(51) Int. Cl.
*H04N 5/243* (2006.01)
*H04N 9/77* (2006.01)

(52) U.S. Cl.
CPC ............... *H04N 5/243* (2013.01); *H04N 9/77* (2013.01)

(58) Field of Classification Search
None
See application file for complete search history.

(56) References Cited

U.S. PATENT DOCUMENTS

| 7,771,906 B2 | 8/2010 | Yoshii et al. |
| 7,978,260 B2 | 7/2011 | Staller |
| 8,199,222 B2 | 6/2012 | Drimbarean et al. |

(Continued)

FOREIGN PATENT DOCUMENTS

| CN | 103458190 A | 12/2013 |
| CN | 104079908 A | 10/2014 |

(Continued)

OTHER PUBLICATIONS

The Extended European Search Report in European Application No. 18857919.7 dated Jun. 19, 2020, 7 pages.

(Continued)

*Primary Examiner* — Twyler L Haskins
*Assistant Examiner* — Dwight Alex C Tejano
(74) *Attorney, Agent, or Firm* — Metis IP LLC

(57) ABSTRACT

The present disclosure relates to image capture systems and methods. The image capture method may include obtaining first color image data including color information with an infrared light source off. The image capture method may also include obtaining first luminance image data including luminance information with the infrared light source on. The image capture method may also include generating a first enhanced image based on the first color image data and the first luminance image data.

17 Claims, 7 Drawing Sheets

(56) References Cited

U.S. PATENT DOCUMENTS

| | | | |
|---|---|---|---|
| 8,724,017 B2 | 5/2014 | Price et al. | |
| 8,743,226 B2 | 6/2014 | Lee | |
| 9,674,438 B2 | 6/2017 | Zhou et al. | |
| 9,894,298 B1 | 2/2018 | Solh | |
| 9,907,530 B2 | 3/2018 | Charnegie et al. | |
| 2005/0270784 A1* | 12/2005 | Hahn | G02B 23/12 |
| | | | 362/459 |
| 2006/0008171 A1* | 1/2006 | Petschnigg | G06T 5/50 |
| | | | 382/254 |
| 2009/0002475 A1* | 1/2009 | Jelley | H04N 7/142 |
| | | | 348/14.01 |
| 2009/0226086 A1 | 9/2009 | Kasahara | |
| 2010/0103268 A1* | 4/2010 | Tokuyama | H04N 9/77 |
| | | | 348/162 |
| 2010/0309315 A1* | 12/2010 | Hogasten | H04N 5/332 |
| | | | 348/164 |
| 2011/0122252 A1 | 5/2011 | Choi | |
| 2013/0002882 A1 | 1/2013 | Onozawa et al. | |
| 2015/0109454 A1* | 4/2015 | Strandemar | G06T 5/50 |
| | | | 348/164 |
| 2015/0334315 A1* | 11/2015 | Teich | G06T 5/20 |
| | | | 348/164 |
| 2016/0198103 A1 | 7/2016 | Tanaka et al. | |
| 2017/0237887 A1 | 8/2017 | Tanaka et al. | |
| 2018/0338092 A1 | 11/2018 | Fan et al. | |

FOREIGN PATENT DOCUMENTS

| | | |
|---|---|---|
| CN | 104661008 A | 5/2015 |
| CN | 104767941 A | 7/2015 |
| JP | 2007243917 A | 9/2007 |
| WO | 2019057170 A1 | 3/2019 |

OTHER PUBLICATIONS

International Search Report in PCT/CN2018/107035 dated Dec. 12, 2018, 4 pages.
Written Opinion in PCT/CN2018/107035 dated Dec. 12, 2018, 6 pages.

* cited by examiner

500

510
Obtaining, from an image capture device, first color image data including color information with an infrared light source off 520
Obtaining, from the image capture device, first luminance image data including luminance information with the infrared light source on 530
Generating a first enhanced image based on the first color image data and the first luminance image data

FIG. 5

METHODS AND SYSTEMS FOR IMAGE CAPTURE

CROSS-REFERENCE TO RELATED APPLICATIONS

This application is a continuation of International Application No. PCT/CN2018/107035, filed on Sep. 21, 2018, which claims priority of Chinese Patent Application No. 201710864066.9 filed on Sep. 22, 2017, the contents of each of which are hereby incorporated by reference in its entirety.

TECHNICAL FIELD

The present disclosure generally relates to image capture, and more specifically relates to methods and systems for enhancing image luminance.

BACKGROUND

In a monitoring system, a camera may capture images or videos in a dark environment, such as at night or in a condition of backlight. In this case, the captured images or videos may have low luminance and contrast, which makes elements in the captured images or videos difficult to be identified and makes the captured images or videos difficult to be further processed (e.g., applied in monitoring). Existing solutions to solve the above problem provide an infrared light source that emits infrared light invisible to human eyes, so as to irradiate an object to be captured in the dark environment. The infrared light is reflected by the object, enters a lens of the camera, and is received by a sensor of the camera. At this point, an image is generated based on the reflected infrared light. Compared to an image generated based on visible light in the dark environment, the luminance of the image generated based on the infrared light is increased. However, the infrared light may affect color sensitivity of the sensor of the camera, so that the color of the image may not be restored, and the image may be black and white. Therefore, it is desirable to provide methods and systems for image capture to generate color images or videos with enhanced luminance in the dark environment.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

According to a first aspect of the present disclosure, an image capture system may include an image capture device, an infrared light source configured to emit infrared light, one or more storage devices, and one or more processors configured to communicate with the one or more storage media. The one or more storage devices may include a set of instructions. When the one or more processors executing the set of instructions, the one or more processors may be directed to perform one or more of the following operations. The one or more processors may obtain first color image data including color information with the infrared light source off. The one or more processors may obtain first luminance image data including luminance information with the infrared light source on. The one or more processors may generate a first enhanced image based on the first color image data and the first luminance image data.

In some embodiments, the one or more processors may perform at least one of the following operations to the first color image data or the first luminance image data: adjusting white balance, color correction, image denoising, and image sharpening.

In some embodiments, the one or more processors may determine a first exposure parameter of the image capture device based on the first color image data. The one or more processors may determine a second exposure parameter of the image capture device based on the first luminance image data.

In some embodiments, the one or more processors may determine the first and the second exposure parameters of the image capture device based on the first enhanced image.

In some embodiments, the one or more processors may obtain second color image data using the first exposure parameter with the infrared light source off. The one or more processors may obtain second luminance image data using the second exposure parameter with the infrared light source on. The one or more processors may generate a second enhanced image based on the second color image data and the second luminance image data.

In some embodiments, the first exposure parameter or the second exposure parameter may include at least one of a shutter speed, an f-number, sensibility, or a gain level.

In some embodiments, to generate the first enhanced image based on the first color image data and the first luminance image data, the one or more processors may determine luminance data and chrominance data based on the first color image data. The one or more processors may determine luminance enhancement data based on the first luminance image data and the luminance data. The one or more processors may generate the first enhanced image based on the luminance enhancement data and the chrominance data.

In some embodiments, the image capture device may include a sensor that is sensitive to visible light and the infrared light.

In some embodiments, the image capture device may further include a double pass filter that allows infrared light with specific wavelengths and the visible light to pass through.

In some embodiments, the double pass filter may allow infrared light with wavelengths 840-860 nm and the visible light to pass through.

According to another aspect of the present disclosure, an image capture method may include one or more of the following operations. One or more processors may obtain first color image data including color information with an infrared light source off, wherein the first color image data may be generated by an image capture device. The one or more processors may obtain first luminance image data including luminance information with the infrared light source on, wherein the first luminance image data may be generated by the image capture device. The one or more processors may generate a first enhanced image based on the first color image data and the first luminance image data.

According to yet another aspect of the present disclosure, an image capture system may include an image data obtaining module configured to obtain first color image data including color information with an infrared light source off, wherein the first color image data is generated by an image capture device. The system may also include a control module configured to obtain first luminance image data including luminance information with the infrared light source on, wherein the first luminance image data is generated by the image capture device. The system may also include an image fusion module configured to generate a first enhanced image based on the first color image data and the first luminance image data.

According to yet another aspect of the present disclosure, a non-transitory computer readable medium may comprise at least one set of instructions. The at least one set of instructions may be executed by one or more processors of a computer server. The one or more processors may obtain first color image data including color information with an infrared light source off, wherein the first color image data may be generated by an image capture device. The one or more processors may obtain first luminance image data including luminance information with the infrared light source on, wherein the first luminance image data may be generated by the image capture device. The one or more processors may generate a first enhanced image based on the first color image data and the first luminance image data.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart illustrating an exemplary process for generating an enhanced image according to some embodiments of the present disclosure;

DETAILED DESCRIPTION

Figure 1:
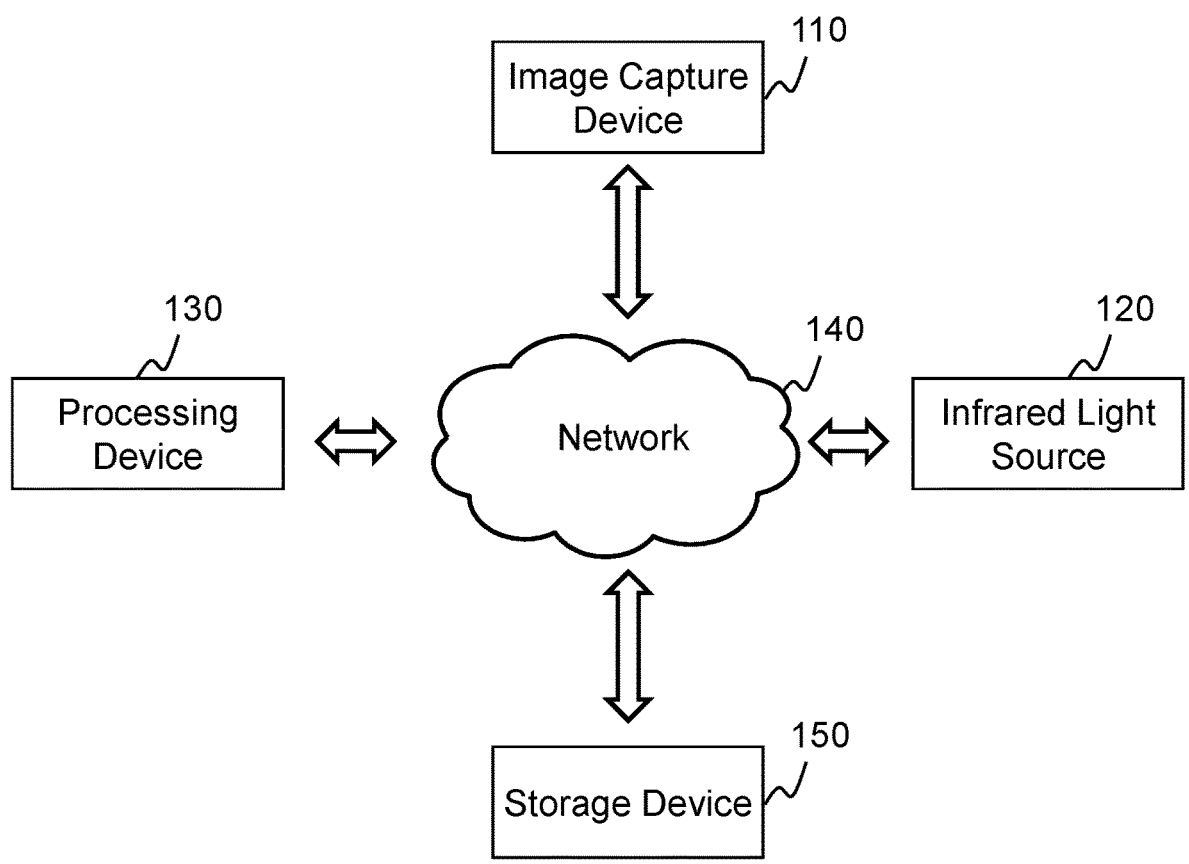
FIG. 1 is a schematic diagram illustrating an exemplary image capture system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," and/or "unit" used herein are one method to distinguish different components, elements, parts, section or assembly of different level in ascending order. However, the terms may be displaced by other expressions if they may achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The disclosure is directed to systems and methods for image capture. Compared to existing processes for continuously providing infrared light to enhance image luminance, in the present disclosure, an infrared light source may be controlled to be turned on or turned off periodically. Image data with color information may be obtained when the infrared light source is off. Image data with luminance information may be obtained when the infrared light source is on. A color image with enhanced luminance may be generated based on the image data with color information and the image data with luminance information.

FIG. 1 is a schematic diagram illustrating an exemplary image capture system 100 according to some embodiments of the present disclosure. In some embodiments, at least part of the image capture system 100 may be implemented with an electronic device that needs to capture images or videos in a dark environment (e.g., an image capture device having a night-vision function), for example, a digital camera, a video camera, a smartphone, a monitoring device, or the like. As illustrated in FIG. 1, the image capture system 100 may include an image capture device 110, an infrared light source 120, a processing device 130, a network 140, and a storage device 150.

The image capture device 110 may be configured to capture images or videos. The images or videos may be two-dimensional (2D) or three-dimensional (3D). In some embodiments, the image capture device 110 may include a digital camera. The digital camera may include a 2D camera, a 3D camera, a panoramic camera, a virtual reality (VR) camera, a web camera, an instant picture camera, a video camera, a surveillance camera, or the like, or any combination thereof. In some embodiments, the image capture device 110 may include a stereo camera. The stereo camera may include a binocular vision device or a multi-camera. In some embodiments, the image capture device 110 may be added to or be part of a medical imaging equipment, a night-vision equipment, a radar equipment, a sonar equipment, an electronic eye, a camcorder, a thermal imaging equipment, a smartphone, a tablet PC, a laptop, a wearable equipment (e.g., 3D glasses), an eye of a robot, a vehicle traveling data recorder, an unmanned device (e.g., a unmanned aerial vehicle (UAV), a driverless car, etc.), a video gaming console, or the like, or any combination thereof.

In some embodiments, the image capture device 110 may include one or more lenses, a sensor, an exposure-time controller, an amplifier, and an analog to digital (A/D) converter.

The lens may be an optical device that focuses light (e.g., visible light and/or infrared light) by means of refraction to form an image. The lens may be configured to intake scenes it is facing at. It may include aperture mechanisms to adjust the aperture of the lens. An aperture of the lens may refer to the size of the hole through which light passes to reach the sensor. The larger the aperture is, the more light the lens takes in, and thereby the brighter the image captured by the image capture device 100 is. The aperture may be adjustable to adjust the amount of light that passes through the lens. The focal lengths of the one or more lenses may be fixed or may be adjustable to adjust the coverage of the image capture device 100.

The sensor may detect and convey the light (e.g., visible light and/or infrared light) taken by the lens into electronic signals. The sensor may include charge coupled device (CCD) and complementary metal-oxide semiconductor (CMOS).

The exposure-time controller may be configured to control an exposure time of the image capture device 110. The exposure time may refer to the length of time when the sensor inside the image capture device 100 generates the electrical signals. In some embodiments, the exposure-time controller may be a shutter device (e.g., a mechanical shutter) configured to open to allow light to reach the sensor through the one or more lenses to make the sensor generate the electrical signals when an image is captured. The shutter device may be controlled manually or automatically. An interval from open to close of the shutter device to take pictures of the scenes may be the exposure time (also referred to as a shutter speed). In some embodiments, the sensor does not generate electrical signals without electricity even though light reaches the sensor. The exposure-time controller may be an electronic shutter to control the length of time when the sensor is charged with electricity (also referred to as the exposure time or the shutter speed). The longer the exposure time is, the more electrical signals the sensor generates, and thereby the brighter the image captured by the image capture device 100 is.

The amplifier may be configured to amplify the electrical signals generated by the sensor. The magnification of the electrical signals generated by the sensor may be referred to as a gain level. The higher the gain level takes, the brighter the image captured by the image capture device 100 is (a side effect of a higher gain level is that the noise is higher as well).

The A/D converter may be configured to transform the amplified electrical signals from the amplifier into digital signals. The digital signals may be transmitted to an image processor (e.g., the processing device 130 or a processor in the image capture device 110) to generate an image.

In some embodiments, the image capture device 110 may communicate with one or more components (e.g., the infrared light source 120, the processing device 130, or the storage device 150) of the image capture device 100 via the network 140. In some embodiments, the image capture device 110 may be directly connected to the one or more components (e.g., the infrared light source 120, the processing device 130, or the storage device 150) of the image capture device 100.

In some embodiments, when the image capture device 110 is in a bright environment, a filter configured to prevent infrared light (e.g., infrared light from objects surrounding the image capture device 110) from being received by the sensor may be added to the image capture device 110, which ensures the color of images captured in the bright environment. The filter may be removed when the image capture device 110 works in the dark environment, which makes the infrared light from the infrared light source 120 be received by the sensor to increase luminance of images captured in the dark environment.

In some embodiments, the image capture device 110 may include a double pass filter that allows infrared light with specific wavelengths (e.g., 840-860 nm) and visible light to pass through. When the image capture device 110 is in the bright environment, the influence of infrared light on the color of images captured in the bright environment may be decreased because the infrared light with specific wavelengths, instead of all infrared light (e.g., infrared light with wavelengths of 700 nm-1 mm), is allowed to be received by the sensor. The luminance of images captured in the dark environment may be increased based on the infrared light with specific wavelengths. Compared to switching the filter between the dark environment and the bright environment, using the double pass filter in the image capture device 110 may avoid time consumption caused by switching the filter.

The infrared light source 120 may emit infrared light invisible to human eyes, so as to irradiate an object to be captured in a dark environment (e.g., at night or in a condition of backlight). In some embodiments, the infrared light emitted from the infrared light source 120 may be allowed to pass through the double pass filter. In some embodiments, the infrared light source 120 may communicate with one or more components (e.g., the image capture device 110, the processing device 130, or the storage device 150) of the image capture device 100 via the network 140. In some embodiments, the infrared light source 120 may be directly connected to the one or more components (e.g., the image capture device 110, the processing device 130, or the storage device 150) of the image capture device 100. In some embodiments, the infrared light source 120 may be part of the image capture device 110. In some embodiments, the infrared light source 120 may be an external device that communicates or does not communicate with the image capture system 100.

The processing device 130 may process information and/or data to perform one or more functions described in the present disclosure. For example, the processing device 130 may generate an enhanced image based on color image data and luminance image data.

In some embodiments, the processing device 130 may be a single server or a server group. The server group may be centralized, or distributed (e.g., the processing device 130 may be a distributed system). In some embodiments, the processing device 130 may be local or remote. For example, the processing device 130 may access/transmit information and/or data in/to the image capture device 110, the infrared light source 120, or the storage device 150 via the network 140. As another example, the processing device 130 may be directly connected to the image capture device 110, the infrared light source 120, or the storage device 150 to access/transmit information and/or data. In some embodiments, the processing device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 130 may be implemented on a computing device 200 having one or more components illustrated in FIG. 2 in the present disclosure.

In some embodiments, the processing device 130 may be implemented on a mobile device, a tablet computer, a laptop computer, a built-in device in a motor vehicle, or the like, or any combination thereof. In some embodiments, the mobile device may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle may include an onboard computer, an onboard television, a traveling data recorder, etc. In some embodiments, the processing device 130 may be implemented on a mobile device 300 having one or more components illustrated in FIG. 3 in the present disclosure.

In some embodiments, the processing device 130 may include one or more processing engines (e.g., single-core processing engine(s) or multi-core processor(s)). Merely by way of example, the processing device 130 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof. In some embodiments, the processing device 130 may be part of the image capture device 110.

The network 140 may be configured to facilitate communications among the components (e.g., the image capture device 110, the infrared light source 120, the processing device 130, and the storage device 150) of the image capture system 100. For example, the network 140 may transmit digital signals from the image capture device 110 to the processing device 130. As another example, the network 140 may transmit images generated by the image capture device 110 to the storage device 150.

In some embodiments, the network 140 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof.

The storage device 150 may be configured to store data and/or instructions. In some embodiments, the storage device 150 may store data obtained from the processing device 130 and/or the image capture device 110. For example, the storage device 150 may store images generated by the processing device 130 and/or the image capture device 110. In some embodiments, the storage device 150 may store data and/or instructions that the processing device 130 may execute or use to perform exemplary methods described in the present disclosure. For example, the storage device 150 may store instructions that the processing device 130 may execute to generate an enhanced image based on color image data and luminance image data. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 140 to communicate with one or more components in the image capture system 100 (e.g., the image capture device 110, the infrared light source 120, and the processing device 130). One or more components in the image capture system 100 may access the data or instructions stored in the storage device 150 via the network 140. In some embodiments, the storage device 150 may be directly connected to or communicate with one or more components in the image capture system 100 (e.g., the image capture device 110, the infrared light source 120, and the processing device 130). In some embodiments, the storage device 150 may be part of the image capture device 110, the infrared light source 120, and/or the processing device 130.

In some embodiments, two or more components of the image capture system 100 may be integrated in one device. For example, the image capture device 110, the processing device 130, and the storage device 150 may be integrated in one device (e.g., a camera, a smartphone, a laptop, a workstation, a server, etc.). In some embodiments, one or more components of the image capture system 100 may be located remote from other components. For example, the image capture device 110 may be installed at a location away from the processing device 130, which may be implemented in a single device with the storage device 150.

It should be noted that the component of the image capture system 100 illustrated in FIG. 1 may be implemented via various ways. For example, the components may be implemented through hardware, software, or a combination thereof. Herein, the hardware may be implemented by a dedicated logic; the software may be stored in the storage, the system may be executed by proper instructions, for example, by a microprocessor or a dedicated design hardware. Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

Figure 2:
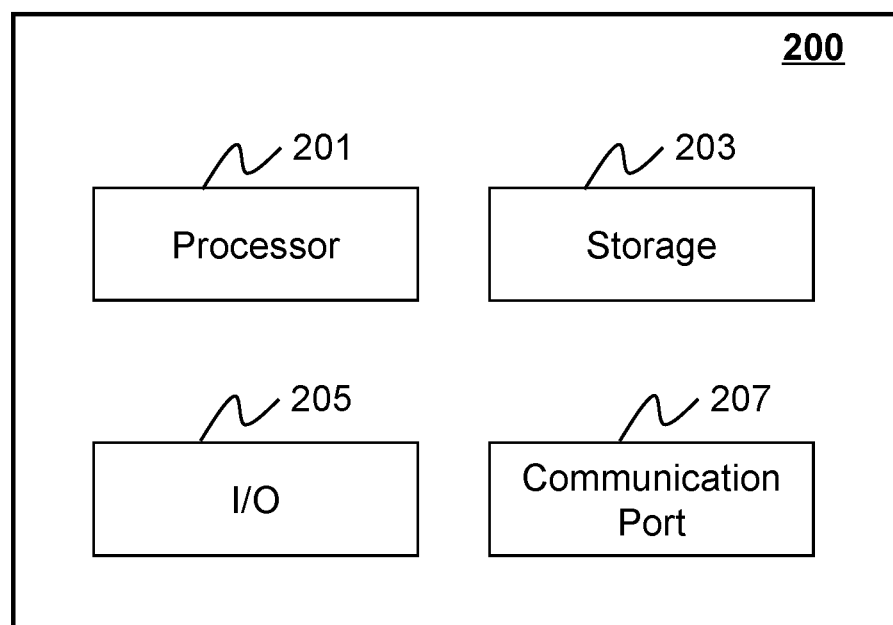
FIG. 2 is a schematic diagram illustrating exemplary hardware and software components of a computing device according to some embodiments of the present disclosure.

FIG. 2 is a schematic diagram illustrating exemplary hardware and/or software components of a computing device on which the image capture device 110, the infrared light source 120, or the processing device 130 may be implemented according to some embodiments of the present disclosure. As illustrated in FIG. 2, the computing device 200 may include a processor 201, a storage 203, an input/output (I/O) 205, and a communication port 207.

The processor 201 may execute computer instructions (program code) and perform functions of the processing device in accordance with techniques described herein. The computer instructions may include routines, programs, objects, components, signals, data structures, procedures, modules, and functions, which perform particular functions described herein. For example, the processing device 130 may be implemented on the computing device 200 and the processor 201 may generate an enhanced image based on color image data and luminance image data. In some embodiments, the processor 201 may include a microcontroller, a microprocessor, a reduced instruction preset computer (RISC), an application specific integrated circuits (ASICs), an application-specific instruction-preset processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 200. However, it should be note that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., a first processor executes step A and a second processor executes step B, or the first and second processors jointly execute steps A and B).

The storage 203 may store data/information obtained from any other component of the computing device 200 (e.g., the processor 201). In some embodiments, the storage 203 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random-access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for generating an enhanced image based on color image data and luminance image data. As another example, the storage 203 may store images captured by the image capture device 110.

The I/O 205 may input or output signals, data, or information. In some embodiments, the I/O 205 may enable a user interaction with the processing device. For example, a captured image may be displayed through the I/O 205. In some embodiments, the I/O 205 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 207 may be connected to a network to facilitate data communications. The communication port 207 may establish connections between the computing device 200 (e.g., the capture device 100) and an external device (e.g., a smart phone). The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 207 may be a standardized communication port, such as RS232, RS485, etc.

Figure 3:
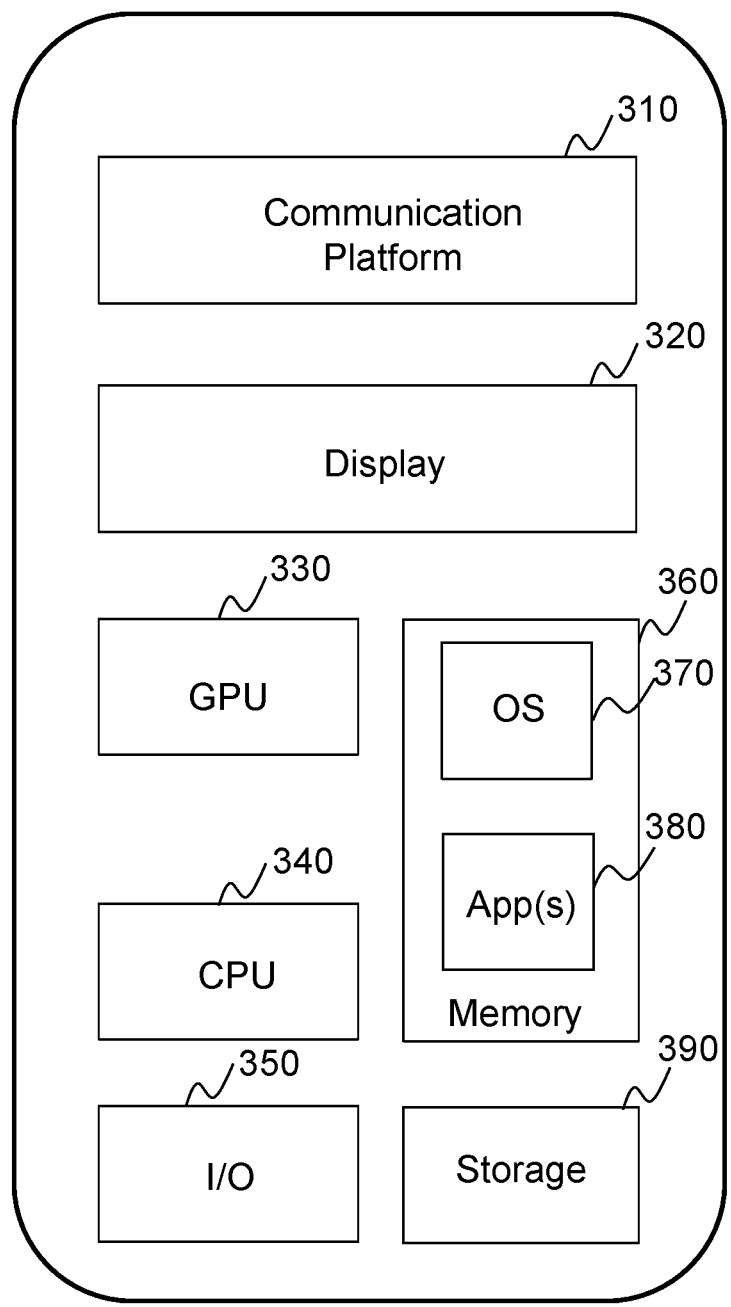
FIG. 3 is a schematic diagram illustrating exemplary hardware and software components of a mobile device according to some embodiments of the present disclosure.

FIG. 3 is a schematic diagram illustrating exemplary hardware and/or software components of a mobile device on which the image capture device 110, the infrared light source 120, or the processing device 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 (e.g., a taxi-hailing application) may include a browser or any other suitable mobile apps for receiving and rendering information relating to transportation services or other information from the processing device 130. User interactions with the information stream may be achieved via the I/O 350 and provided to the processing device 130 and/or other components of the speed prediction system 100 via the network 140. Merely by way of example, a road feature transmit to a service requester may be displayed in the user terminal 140 through the display 320. As another example, a service provider may input an image related to a road segment through the I/O 350.

Hence, aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution (e.g., an installation on an existing server). In addition, image processing as disclosed herein may be implemented as firmware, a firmware/software combination, a firmware/hardware combination, or a hardware/firmware/software combination.

Figure 4:
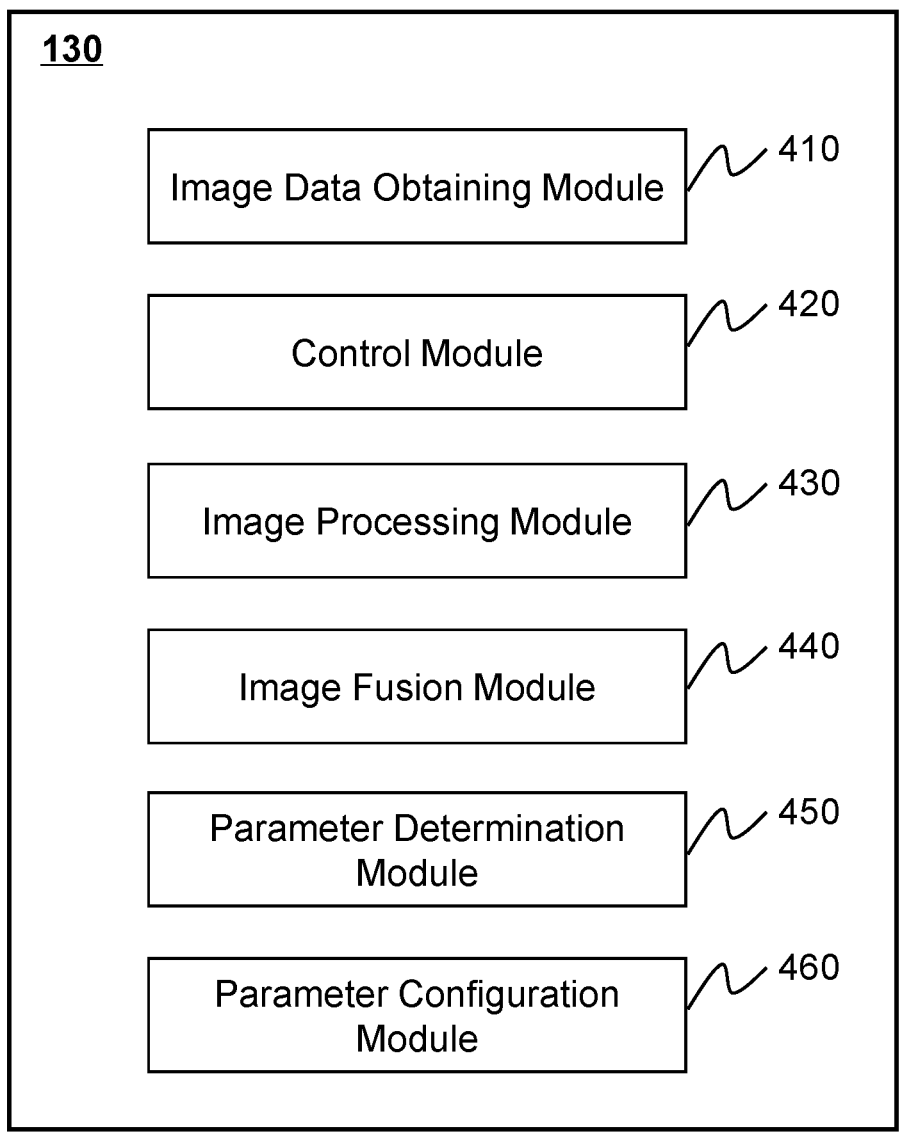
FIG. 4 is a schematic diagram illustrating an exemplary processing device according to some embodiments of the present disclosure.

FIG. 4 is a schematic diagram illustrating an exemplary processing device according to some embodiments of the present disclosure. The processing device 130 may include an image data obtaining module 410, a control module 420, an image processing module 430, an image fusion module 440, a parameter determination module 450, and a parameter configuration module 460.

The image data obtaining module 410 may be configured to obtain, from the image capture device 110, first color image data including color information with the infrared light source 120 off. In some embodiments, the first color image data may be generated by the image capture device 110 in one exposure or multiple exposures (e.g., two exposures) with the infrared light source 120 off. In some embodiments, image data (also referred to as raw data) may refer to the digital signals related to the captured scenes generated by the image capture device 110. The color image data may refer to the image data generated based on visible light with the infrared light source 120 off when the environment is dark. Because the visible light includes the color information, the color image data may include the color information. In some embodiments, the image data obtaining module 410 may record the image data generated during the infrared light source 120 is off (e.g., the image data generated based on the visible light) as the color image data.

The image data obtaining module 410 may be further configured to obtain, from the image capture device 110, first luminance image data including luminance information with the infrared light source 120 on. In some embodiments, the first color image data may be generated by the image capture device 110 in one exposure or multiple exposures (e.g., two exposures) with the infrared light source 120 on. The luminance image data may refer to the image data generated based on the infrared light with the infrared light source 120 on when the environment is dark. In some embodiments, the greater the ability of an object to reflect infrared light is, the stronger the infrared light signals received by the sensor may be, and the brighter the object in the generated image may be. As a result, the luminance image data may include luminance information. In some embodiments, the image data obtaining module 410 may record the image data generated during the infrared light source 120 is on (e.g., the image data generated based on the infrared light) as the luminance image data.

The control module 420 may be configured to transmit control signals to the infrared light source 120, transmit exposure signals to the image capture device 110, transmit synchronization signals to the image capture device 110, or transmit the parameter configuration signals to the parameter configuration module 460.

Figure 7:
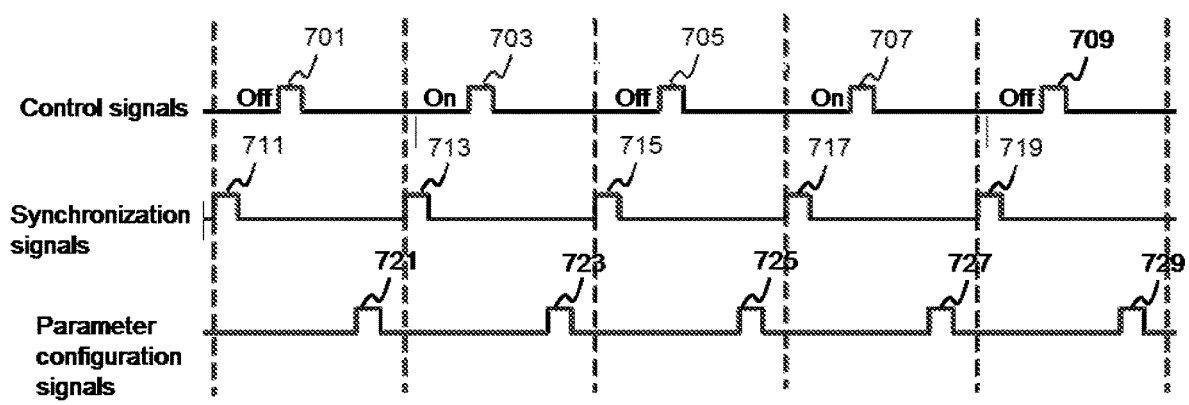
FIG. 7 is a schematic diagram illustrating an example of time sequences of control signals, synchronization signals, and parameter configuration signals.

The infrared light source 120 may be turned on or turned off based on control signals (e.g., signals 701-709 shown in FIG. 7). For example, when the infrared light source 120 receives a control signal, the infrared light source 120 may determine whether the infrared light source 120 is on or off. In response to a determination that the infrared light source 120 is on, the infrared light source 120 may be turned off. In response to a determination that the infrared light source 120 is off, the infrared light source 120 may be turned on. As another example, when the infrared light source 120 receives a control signal for turning off the infrared light source 120, the infrared light source 120 may be turned off. When the infrared light source 120 receives a control signal for turning on the infrared light source 120, the infrared light source 120 may be turned on. The control signals for turning off the infrared light source 120 may be alternating with the control signals for turning on the infrared light source 120 (e.g., signals 701-709 shown in FIG. 7). In some embodiments, the control signals may be generated and transmitted to the infrared light source 120 in a constant variable frequency.

In some embodiments, the image capture device 110 may capture image data (e.g., the digital signals) at a specific frequency based on exposure signals with a frequency same as the control signals. For example, when receiving an exposure signal, the exposure-time controller (e.g., the shutter device) in the image capture device 110 may be initiated to open for a period of time (e.g., equal to the exposure time) to allow light to reach the sensor through the one or more lenses to make the sensor generate the electrical signals. As another example, when receiving an exposure signal, the exposure-time controller (e.g., an electronic shutter) may be initiated to control the sensor to be charged with electricity for a period of time (e.g., equal to the exposure time).

The exposure signals may synchronize or not synchronize with the control signals. For example, the control signals or signals synchronizing with the control signals may be transmitted to the image capture device 110 to initiate the exposure-time controller. As another example, synchronization signals (e.g., signals 711-719 shown in FIG. 7) or signals synchronizing with the synchronization signals may be transmitted to the image capture device 110 to initiate the exposure-time controller.

In some embodiments, the image capture device 110 may transmit the first color image data and/or the first luminance image data to the processing device 130 (e.g., the image data obtaining module 410) when receiving a synchronization signal (e.g., signals 711-719 shown in FIG. 7). In some embodiments, the frequency of the control signals may be similar to the frequency of the synchronization signals. The control signals may synchronize or not synchronize with the synchronization signals (e.g., as shown in FIG. 7).

In some embodiments, if the control signals, the synchronization signals, or the exposure signals have a constant frequency, the exposure time of the image capture device 110 may be equal to or shorter than an interval between two adjacent exposure signals. Further, the exposure time of the image capture device 110 may be equal to or shorter than an interval from an exposure signal to a synchronization signal next to the exposure signal. During an interval from a synchronization signal to an exposure signal next to the synchronization signal, the image capture device 110 may be prepared for exposuring and generate no image data.

The image processing module 430 may be configured to process the first color image data and/or the first luminance image data. In some embodiments, the image processing module 430 may perform the following operations to the first color image data and/or the first luminance image data: adjusting white balance, color correction, image denoising, image sharpening, or the like, or any combination thereof.

In some embodiments, the image processing module 430 may generate a first image with the color information by processing the first color image data and/or the processed first color image data. The image processing module 430 may generate a second image with the luminance information by processing the first luminance image data and/or the processed first luminance image data.

The image fusion module 440 may be configured to generate a first enhanced image based on the first color image data and the first luminance image data (or the processed first color image data and the processed first luminance image data, and/or the first image with the color information and the second image with the luminance information). The first enhanced image may be a color image with enhanced luminance. In some embodiments, the image fusion module 440 may generate the first enhanced image using image fusion. Image fusion may be a process of combining relevant information (e.g., the color information and the luminance information) from data relating to two or more images (e.g., the first color image data and the first luminance image data, or the first image and the second image) into a single image.

Exemplary image fusion methods may include high pass filtering technique, IHS (intensity, hue, saturation) transform based image fusion, PCA (principal component analysis) based image fusion, wavelet transform image fusion, pairwise spatial frequency matching, or the like, or any combination thereof.

Taking the first color image data and the first luminance image data as an example, the image fusion module 440 may determine luminance data and chrominance data from the first color image data. For example, the image fusion module 440 may transform the representation of the first color image data from an RGB (red, green, blue) model to a model including lightness, hue, and saturation (e.g., a HSV (hue, saturation, value) model, a HSL (hue, saturation, lightness) model, etc.). Before determining the luminance data and the chrominance data, the image fusion module 440 may perform image enhancement on the first color image data to increase the resolution and the contrast of the first color image data, so that it is easier to determine the luminance data and the chrominance data from the first color image data. The image fusion module 440 may determine luminance enhancement data based on the first luminance image data and the luminance data. For example, the image fusion module 440 may determine the luminance enhancement data by comparing luminance values in the first luminance image data and the luminance data. The image fusion module 440 may generate the first enhanced image based on the luminance enhancement data and the chrominance data. For example, the image fusion module 440 may replace the luminance data in the first color image data with the luminance enhancement data and generate the first enhanced image.

It should be noted that the process for image fusion described above are merely some examples or implementations. For persons having ordinary skills in the art, the process for image fusion described above may be applied to other similar situations, such as, the processed first color image data and the processed first luminance image data, and/or the first image and the second image.

The parameter determination module 450 may be configured to determine a first exposure parameter of the image capture device 110 based on previous color image data (e.g., the first color image data) and/or a previous enhanced image (e.g., the first enhanced image). The first exposure parameter may be used to generate color image data when the infrared light source 120 is off.

The first exposure parameter may include a shutter speed (also referred to as an exposure time), an f-number, sensibility of the sensor, a gain level, or the like, or any combination thereof. The f-number may be the ratio of the focal length of the image capture device 110 to the diameter of the entrance pupil of the image capture device 110. The smaller the f-number is, the more the light into the image capture device 110 in unit time may be.

In some embodiments, the previous color image data (e.g., the first color image data) and the previous enhanced image (e.g., the first enhanced image) may include image quality information, such as resolution information and contrast information. The parameter determination module 450 may analyze the image quality information in the previous color image data (e.g., the first color image data) and/or the previous enhanced image (e.g., the first enhanced image), and adjust the exposure parameter used to generate the previous color image data (e.g., the first color image data) based on the analysis result to determine the first exposure parameter. According to the first exposure parameter, color image data with higher image quality compared to the previous color image data (e.g., the first color image data) and/or an enhanced image with higher image quality compared to the previous enhanced image (e.g., the first enhanced image) may be generated.

In some embodiments, the parameter determination module 450 may determine the first exposure parameter before the infrared light source 120 receives a next control signal relating to turning off the infrared light source 120.

Alternatively or additionally, the parameter determination module 450 may determine the first exposure parameter using machine learning techniques. For example, the parameter determination module 450 may input the previous color image data, the previous enhanced image, the exposure parameter used to generate the previous color image data, desired image quality (e.g., image resolution and image contrast) of color image data and/or an enhanced image, the current time, the current weather of the environment in which the image capture device 110 locates, or the like, or any combination thereof, to a machine learning model. Then the machine learning model may output the first exposure parameter.

The parameter determination module 450 may be further configured to determine a second exposure parameter of the image capture device 110 based on previous luminance image data (e.g., the first luminance image data) and/or the previous enhanced image (e.g., the first enhanced image). The second exposure parameter may be used to generate luminance image data when the infrared light source 120 is on.

The second exposure parameter may include a shutter speed (also referred to as an exposure time), an f-number, sensibility of the sensor, a gain level, or the like, or any combination thereof.

In some embodiments, the previous luminance image data (e.g., the first luminance image data) and the previous enhanced image (e.g., the first enhanced image) may include image quality information, such as resolution information and contrast information. The parameter determination module 450 may analyze the image quality information in the previous luminance image data (e.g., the first luminance image data) and/or the previous enhanced image (e.g., the first enhanced image), and adjust the exposure parameter used to generate the previous luminance image data (e.g., the first luminance image data) based on the analysis result to determine the second exposure parameter. According to the second exposure parameter, luminance image data with higher image quality compared to the previous luminance image data (e.g., the first luminance image data) and/or an enhanced image with higher image quality compared to the previous enhanced image (e.g., the first enhanced image) may be generated.

In some embodiments, the parameter determination module 450 may determine the second exposure parameter before the infrared light source 120 receives a next control signal relating to turning on the infrared light source 120.

Alternatively or additionally, the parameter determination module 450 may determine the second exposure parameter using machine learning techniques. For example, the parameter determination module 450 may input, to a machine learning model, the first luminance image data, the first enhanced image, the exposure parameter used to generate the first luminance image data, desired image quality (e.g., image resolution and image contrast) of luminance image data and/or an enhanced image, the current time, the current weather of the environment in which the image capture device 110 locates, or the like, or any combination thereof, to the machine learning model. Then the machine learning model may output the second exposure parameter.

The parameter configuration module 460 may be configured to configure the image capture device 110 based on the first exposure parameter (e.g., adjust the current exposure parameter of the image capture device 110 to the first exposure parameter). In some embodiments, the parameter configuration module 460 may do this before the infrared light source 120 receives a next control signal relating to turning off the infrared light source 120.

The parameter configuration module 460 may be further configured to configure the image capture device 110 based on the second exposure parameter (e.g., adjust the current exposure parameter of the image capture device 110 to the second exposure parameter). In some embodiments, the parameter configuration module 460 may do this before the infrared light source 120 receives a next control signal relating to turning on the infrared light source 120.

In some embodiments, the parameter configuration module 460 may configure the image capture device 110 when receiving parameter configuration signals (e.g., signals 721-729 shown in FIG. 7). For example, when receiving a parameter configuration signal for configuring the image capture device 110 to generate color image data (called "color parameter configuration signal" for short), the parameter configuration module 460 may configure the image capture device 110 based on a latest determined exposure parameter used to generate color image data. As another example, when receiving a parameter configuration signal for configuring the image capture device 110 to generate luminance image data (called "luminance parameter configuration signal" for short), the parameter configuration module 460 may configure the image capture device 110 based on a latest determined exposure parameter used to generate luminance image data. The color parameter configuration signals may be alternating with the luminance parameter configuration signals.

In some embodiments, because the configuration of the image capture device 110 is not effective immediately, the color parameter configuration signal may be transmitted to the parameter configuration module 460 before the infrared light source 120 receives the next control signal relating to turning off the infrared light source 120 so that the parameter configuration module 460 may complete the configuration before or at the same time when the infrared light source 120 receives the next control signal relating to turning off the infrared light source 120, and the luminance parameter configuration signal may be transmitted to the parameter configuration module 460 before the infrared light source 120 receives the next control signal relating to turning on the infrared light source 120 so that the parameter configuration module 460 may complete the configuration before or at the same time when the infrared light source 120 receives the next control signal relating to turning on the infrared light source 120.

In some embodiments, the frequency of the parameter configuration signals may be similar to the frequency of the synchronization signals and the control signals, but the parameter configuration signals may not synchronize with the synchronization signals nor the control signals (e.g., as shown in FIG. 7).

The modules in the processing device 130 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the image data obtaining module 410 and the image processing module 430 may be combined into a single module which may both obtain and process the color image data and the luminance image data. As another example, the image data obtaining module 410 may be divided into two units. A first unit may obtain the color image data. A second unit may obtain the luminance image data.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 130 may further include a storage module (not shown in FIG. 4). The storage module may be configured to store data generated during any process performed by any component of in the processing device 130. As another example, each of components of the processing device 130 may correspond to a storage module, respectively. Additionally or alternatively, the components of the processing device 130 may share a common storage module.

FIG. 5 is a flowchart illustrating an exemplary process for generating an enhanced image according to some embodiments of the present disclosure. In some embodiments, the process 500 may be implemented in the image capture system 100 illustrated in FIG. 1. For example, the process 500 may be stored in a storage medium (e.g., the storage device 150, the storage 220, the memory 360, or the storage 390) as a form of instructions, and can be invoked and/or executed by the processing device 130 (e.g., the processor 210, the CPU 340, or one or more modules in the processing device 130 illustrated in FIG. 4). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting. In some embodiments, the process 500 may be used to generate one enhanced image. The processing device 130 may generate a plurality of enhanced images by repeating the process 500.

The infrared light source 120 may be turned on or turned off based on control signals (e.g., signals 701-709 shown in FIG. 7). For example, when the infrared light source 120 receives a control signal, the infrared light source 120 may determine whether the infrared light source 120 is on or off. In response to a determination that the infrared light source 120 is on, the infrared light source 120 may be turned off. In response to a determination that the infrared light source 120 is off, the infrared light source 120 may be turned on. As another example, when the infrared light source 120 receives a control signal for turning off the infrared light source 120, the infrared light source 120 may be turned off. When the infrared light source 120 receives a control signal for turning on the infrared light source 120, the infrared light source 120 may be turned on. The control signals for turning off the infrared light source 120 may be alternating with the control signals for turning on the infrared light source 120 (e.g., signals 701-709 shown in FIG. 7).

In some embodiments, the control signals may be generated and transmitted to the infrared light source 120 in a constant or variable frequency. In some embodiments, the control signals may be transmitted from the processing device 130 (e.g., the control module 420) to the infrared light source 120. In some embodiments, a controller in the infrared light source 120 may transmit the control signals. In some embodiments, the control signals may be transmitted from an external device to the infrared light source 120.

In some embodiments, the image capture device 110 may capture image data (e.g., the digital signals) at a specific frequency based on exposure signals with a frequency same as the control signals. For example, when receiving an exposure signal, the exposure-time controller (e.g., the shutter device) in the image capture device 110 may be initiated to open for a period of time (e.g., equal to the exposure time) to allow light to reach the sensor through the one or more lenses to make the sensor generate the electrical signals. As another example, when receiving an exposure signal, the exposure-time controller (e.g., an electronic shutter) may be initiated to control the sensor to be charged with electricity for a period of time (e.g., equal to the exposure time).

The exposure signals may synchronize or not synchronize with the control signals. For example, the control signals or signals synchronizing with the control signals may be transmitted to the image capture device 110 to initiate the exposure-time controller. As another example, synchronization signals (e.g., signals 711-719 shown in FIG. 7) or signals synchronizing with the synchronization signals may be transmitted to the image capture device 110 to initiate the exposure-time controller. In some embodiments, the exposure signals may be transmitted from the processing device 130 (e.g., the control module 420) to the image capture device 110. In some embodiments, a controller in the image capture device 110 may transmit the exposure signals. In some embodiments, the exposure signals may be transmitted from an external device to the image capture device 110.

In some embodiments, the infrared light source 120 may work, based on the control signals, when the image capture device 110 is in the dark environment. For example, when the image capture device 110 works, the image capture device 110 may detect the amount of light into the image capture device 110 and determine whether the amount of light is less than a threshold continuously, periodically (e.g., simultaneously with the control signals), or at a specific time (e.g., once an hour at the hour in 0:00-7:00 and 18:00-23:59 every day). In response to a determination that the amount of light is less than the threshold, which indicates that the image capture device 100 is in the dark environment, the image capture device 110 may transmit, to a device (e.g., the processing device 130, a controller in the infrared light source 120, or an external device) configured to transmit the control signals to the infrared light source 120, electronic signals including an instruction for transmitting the control signals to the infrared light source 120, and transmit, to the processing device 130, electronic signals including an instruction for generating enhanced images based on the process 500. In response to a determination that the amount of light is greater than or equal to the threshold, which indicates that the image capture device 100 is in the bright environment, the infrared light source 120 may be turned off/remain off.

In 510, the image data obtaining module 410 may obtain, from the image capture device 110, first color image data including color information with the infrared light source 120 off. In some embodiments, the first color image data may be generated by the image capture device 110 in one exposure or multiple exposures (e.g., two exposures) with the infrared light source 120 off. In some embodiments, image data (also referred to as raw data) may refer to the digital signals related to the captured scenes generated by the image capture device 110. The color image data may refer to the image data generated based on visible light with the infrared light source 120 off when the environment is dark. Because the visible light includes the color information, the color image data may include the color information. In some embodiments, the image data obtaining module 410 may record the image data generated during the infrared light source 120 is off (e.g., the image data generated based on the visible light) as the color image data.

In 520, the image data obtaining module 410 may obtain, from the image capture device 110, first luminance image data including luminance information with the infrared light source 120 on. In some embodiments, the first color image data may be generated by the image capture device 110 in one exposure or multiple exposures (e.g., two exposures) with the infrared light source 120 on. The luminance image data may refer to the image data generated based on the infrared light with the infrared light source 120 on when the environment is dark. In some embodiments, the greater the ability of an object to reflect infrared light is, the stronger the infrared light signals received by the sensor may be, and the brighter the object in the generated image may be. As a result, the luminance image data may include luminance information. In some embodiments, the image data obtaining module 410 may record the image data generated during the infrared light source 120 is on (e.g., the image data generated based on the infrared light) as the luminance image data.

In some embodiments, the image capture device 110 may transmit the first color image data and/or the first luminance image data to the processing device 130 (e.g., the image data obtaining module 410) in real time. In some embodiments, the image capture device 110 may transmit the first color image data and/or the first luminance image data to the processing device 130 (e.g., the image data obtaining module 410) in a predetermined time period after capturing the first color image data and/or the first luminance image data.

In some embodiments, the image capture device 110 may transmit the first color image data and/or the first luminance image data to the processing device 130 (e.g., the image data obtaining module 410) when receiving a synchronization signal (e.g., signals 711-719 shown in FIG. 7). In some embodiments, the frequency of the control signals may be similar to the frequency of the synchronization signals. The control signals may synchronize or not synchronize with the synchronization signals (e.g., as shown in FIG. 7). In some embodiments, the synchronization signals may be transmitted from the processing device 130 (e.g., the control module 420) to the image capture device 110. In some embodiments, a controller in the image capture device 110 may transmit the synchronization signals. In some embodiments, the synchronization signals may be transmitted from an external device to the image capture device 110.

In some embodiments, if the control signals, the synchronization signals, or the exposure signals have a constant frequency, the exposure time of the image capture device 110 may be equal to or shorter than an interval between two adjacent exposure signals. Further, the exposure time of the image capture device 110 may be equal to or shorter than an interval from an exposure signal to a synchronization signal next to the exposure signal. During an interval from a synchronization signal to an exposure signal next to the synchronization signal, the image capture device 110 may be prepared for exposuring and generate no image data.

In some embodiments, after the color image data and/or the luminance image data is obtained, the image processing module 430 may process the first color image data and/or the first luminance image data. In some embodiments, the image processing module 430 may perform the following operations to the first color image data and/or the first luminance image data: adjusting white balance, color correction, image denoising, image sharpening, or the like, or any combination thereof.

In some embodiments, the image processing module 430 may generate a first image with the color information by processing the first color image data and/or the processed first color image data. The image processing module 430 may generate a second image with the luminance information by processing the first luminance image data and/or the processed first luminance image data.

In some embodiments, at least one of the process for processing the first color image data, the process for processing the first luminance image data, the process for generating the first image with color information, and the process for generating the second image with luminance information may be performed by the image capture device 110.

In 530, the image fusion module 440 may generate a first enhanced image based on the first color image data and the first luminance image data (or the processed first color image data and the processed first luminance image data, and/or the first image with the color information and the second image with the luminance information). The first enhanced image may be a color image with enhanced luminance. In some embodiments, the image fusion module 440 may generate the first enhanced image using image fusion. Image fusion may be a process of combining relevant information (e.g., the color information and the luminance information) from data relating to two or more images (e.g., the first color image data and the first luminance image data, or the first image and the second image) into a single image.

Exemplary image fusion methods may include high pass filtering technique, IHS (intensity, hue, saturation) transform based image fusion, PCA (principal component analysis) based image fusion, wavelet transform image fusion, pairwise spatial frequency matching, or the like, or any combination thereof.

Taking the first color image data and the first luminance image data as an example, the image fusion module 440 may determine luminance data and chrominance data from the first color image data. For example, the image fusion module 440 may transform the representation of the first color image data from an RGB (red, green, blue) model to a model including lightness, hue, and saturation (e.g., a HSV (hue, saturation, value) model, a HSL (hue, saturation, lightness) model, etc.). Before determining the luminance data and the chrominance data, the image fusion module 440 may perform image enhancement on the first color image data to increase the resolution and the contrast of the first color image data, so that it is easier to determine the luminance data and the chrominance data from the first color image data. The image fusion module 440 may determine luminance enhancement data based on the first luminance image data and the luminance data. For example, the image fusion module 440 may determine the luminance enhancement data by comparing luminance values in the first luminance image data and the luminance data. The image fusion module 440 may generate the first enhanced image based on the luminance enhancement data and the chrominance data. For example, the image fusion module 440 may replace the luminance data in the first color image data with the luminance enhancement data and generate the first enhanced image.

It should be noted that the process for image fusion described above are merely some examples or implementations. For persons having ordinary skills in the art, the process for image fusion described above may be applied to other similar situations, such as, the processed first color image data and the processed first luminance image data, and/or the first image and the second image.

In some embodiments, when the image capture device 110 is in the bright environment, without performing the process 500, the frequency of outputting images may be equal to the frequency of generating the image data (e.g., the frequency of the control signals and/or the frequency of the synchronization signals). When the image capture device 110 is in the dark environment, the frequency of generating the image data may be at least twice the frequency of outputting enhanced images by performing the process 500.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 510 and/or operation 520 may be performed by the image capture device 110. As another example, operation 510 may be performed before or after operation 520. Alternatively, operations 510 and 520 may be performed simultaneously.

Figure 6:
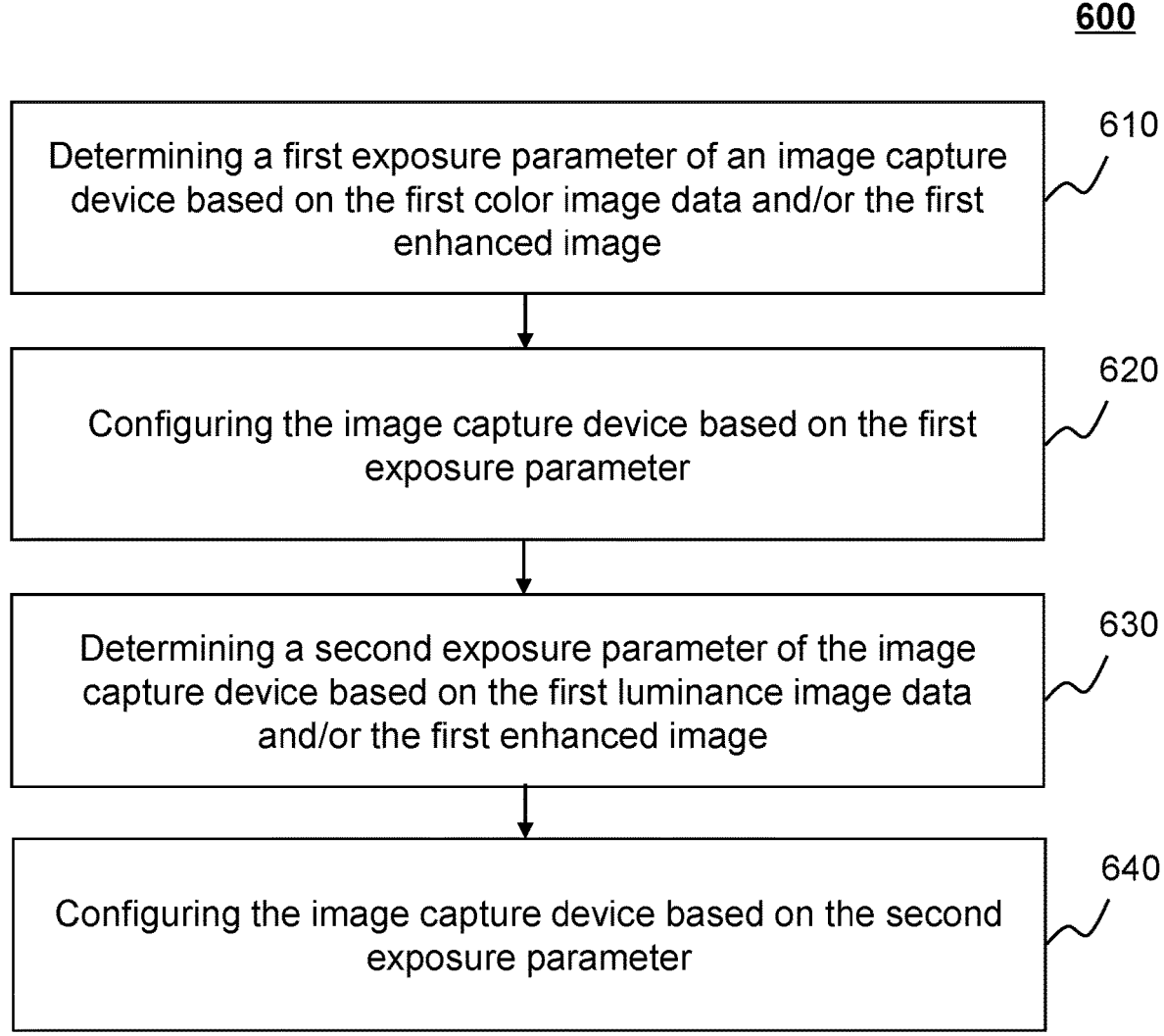
FIG. 6 is a flowchart illustrating an exemplary process for configuring an image capture device based on an exposure parameter according to some embodiments of the present disclosure.

FIG. 6 is a flowchart illustrating an exemplary process for configuring an image capture device based on an exposure parameter according to some embodiments of the present disclosure. In some embodiments, the process 600 may be implemented in the image capture system 100 illustrated in FIG. 1. For example, the process 600 may be stored in a storage medium (e.g., the storage device 150, the storage 220, the memory 360, or the storage 390) as a form of instructions, and can be invoked and/or executed by the processing device 130 (e.g., the processor 210, the CPU 340, or one or more modules in the processing device 130 illustrated in FIG. 4). The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting. In some embodiments, according to the process 500, one or more operations of the process 600 may be performed to configure the image capture device 110.

In 610, the parameter determination module 450 may determine a first exposure parameter of the image capture device 110 based on previous color image data (e.g., the first color image data) and/or a previous enhanced image (e.g., the first enhanced image). The first exposure parameter may be used to generate color image data when the infrared light source 120 is off.

The first exposure parameter may include a shutter speed (also referred to as an exposure time), an f-number, sensibility of the sensor, a gain level, or the like, or any combination thereof. The f-number may be the ratio of the focal length of the image capture device 110 to the diameter of the entrance pupil of the image capture device 110. The smaller the f-number is, the more the light into the image capture device 110 in unit time may be.

In some embodiments, the previous color image data (e.g., the first color image data) and the previous enhanced image (e.g., the first enhanced image) may include image quality information, such as resolution information and contrast information. The parameter determination module 450 may analyze the image quality information in the previous color image data (e.g., the first color image data) and/or the previous enhanced image (e.g., the first enhanced image), and adjust the exposure parameter used to generate the previous color image data (e.g., the first color image data) based on the analysis result to determine the first exposure parameter. According to the first exposure parameter, color image data with higher image quality compared to the previous color image data (e.g., the first color image data) and/or an enhanced image with higher image quality compared to the previous enhanced image (e.g., the first enhanced image) may be generated.

In some embodiments, the parameter determination module 450 may perform operation 610 before the infrared light source 120 receives a next control signal relating to turning off the infrared light source 120.

Alternatively or additionally, the parameter determination module 450 may determine the first exposure parameter using machine learning techniques. For example, the parameter determination module 450 may input the previous color image data, the previous enhanced image, the exposure parameter used to generate the previous color image data, desired image quality (e.g., image resolution and image contrast) of color image data and/or an enhanced image, the current time, the current weather of the environment in which the image capture device 110 locates, or the like, or any combination thereof, to a machine learning model. Then the machine learning model may output the first exposure parameter.

In 620, the parameter configuration module 460 may configure the image capture device 110 based on the first exposure parameter (e.g., adjust the current exposure parameter of the image capture device 110 to the first exposure parameter). In some embodiments, the parameter configuration module 460 may perform operation 620 before the infrared light source 120 receives a next control signal relating to turning off the infrared light source 120.

In 630, the parameter determination module 450 may determine a second exposure parameter of the image capture device 110 based on previous luminance image data (e.g., the first luminance image data) and/or the previous enhanced image (e.g., the first enhanced image). The second exposure parameter may be used to generate luminance image data when the infrared light source 120 is on.

The second exposure parameter may include a shutter speed (also referred to as an exposure time), an f-number, sensibility of the sensor, a gain level, or the like, or any combination thereof.

In some embodiments, the previous luminance image data (e.g., the first luminance image data) and the previous enhanced image (e.g., the first enhanced image) may include image quality information, such as resolution information and contrast information. The parameter determination module 450 may analyze the image quality information in the previous luminance image data (e.g., the first luminance image data) and/or the previous enhanced image (e.g., the first enhanced image), and adjust the exposure parameter used to generate the previous luminance image data (e.g., the first luminance image data) based on the analysis result to determine the second exposure parameter. According to the second exposure parameter, luminance image data with higher image quality compared to the previous luminance image data (e.g., the first luminance image data) and/or an enhanced image with higher image quality compared to the previous enhanced image (e.g., the first enhanced image) may be generated.

In some embodiments, the parameter determination module 450 may perform operation 630 before the infrared light source 120 receives a next control signal relating to turning on the infrared light source 120.

Alternatively or additionally, the parameter determination module 450 may determine the second exposure parameter using machine learning techniques. For example, the parameter determination module 450 may input, to a machine learning model, the first luminance image data, the first enhanced image, the exposure parameter used to generate the first luminance image data, desired image quality (e.g., image resolution and image contrast) of luminance image data and/or an enhanced image, the current time, the current weather of the environment in which the image capture device 110 locates, or the like, or any combination thereof, to the machine learning model. Then the machine learning model may output the second exposure parameter.

In 640, the parameter configuration module 460 may configure the image capture device 110 based on the second exposure parameter (e.g., adjust the current exposure parameter of the image capture device 110 to the second exposure parameter). In some embodiments, the parameter configuration module 460 may perform operation 640 before the infrared light source 120 receives a next control signal relating to turning on the infrared light source 120.

In some embodiments, the parameter configuration module 460 may configure the image capture device 110 when receiving parameter configuration signals (e.g., signals 721-729 shown in FIG. 7). For example, when receiving a parameter configuration signal for configuring the image capture device 110 to generate color image data (called "color parameter configuration signal" for short), the parameter configuration module 460 may configure the image capture device 110 based on a latest determined exposure parameter used to generate color image data. As another example, when receiving a parameter configuration signal for configuring the image capture device 110 to generate luminance image data (called "luminance parameter configuration signal" for short), the parameter configuration module 460 may configure the image capture device 110 based on a latest determined exposure parameter used to generate luminance image data. The color parameter configuration signals may be alternating with the luminance parameter configuration signals.

In some embodiments, because the configuration of the image capture device 110 is not effective immediately, the color parameter configuration signal may be transmitted to the parameter configuration module 460 before the infrared light source 120 receives the next control signal relating to turning off the infrared light source 120 so that the parameter configuration module 460 may complete the configuration before or at the same time when the infrared light source 120 receives the next control signal relating to turning off the infrared light source 120, and the luminance parameter configuration signal may be transmitted to the parameter configuration module 460 before the infrared light source 120 receives the next control signal relating to turning on the infrared light source 120 so that the parameter configuration module 460 may complete the configuration before or at the same time when the infrared light source 120 receives the next control signal relating to turning on the infrared light source 120.

In some embodiments, the frequency of the parameter configuration signals may be similar to the frequency of the synchronization signals and the control signals, but the parameter configuration signals may not synchronize with the synchronization signals nor the control signals (e.g., as shown in FIG. 7). In some embodiments, the parameter configuration signals may be transmitted from the processing device 130 (e.g., the control module 420) to the parameter configuration module 460. In some embodiments, a controller in the image capture device 110 may transmit the parameter configuration signals to the parameter configuration module 460. In some embodiments, the parameter configuration signals may be transmitted from an external device to the parameter configuration module 460.

In some embodiments, the process for configuring the image capture device 110 may be performed during/after each or at least one enhanced image is generated.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, at least one of operations 610-640 may be performed by the image capture device 110. As another example, operation 610 may be performed before or after operation 630. Alternatively, operations 610 and 630 may be performed simultaneously.

FIG. 7 is a schematic diagram illustrating an example of time sequences of control signals, synchronization signals, and parameter configuration signals.

As shown in FIG. 7, signals 701-709 are control signals configured to turn on or turn off the infrared light source 120. Signals 701, 705, and 709 are configured to turn off the infrared light source 120. Signals 703 and 707 are configured to turn on the infrared light source 120. Signals 711-719 are synchronization signals configured to transmit image data from the image capture device 110 to the processing device 130. Signals 721-729 are parameter configuration signals configured to configure the image capture device 110 (e.g., adjust the exposure parameter of the image capture device 110).

As shown in FIG. 7, the frequency of the parameter configuration signals, the frequency of the synchronization signals, and the frequency of the control signals are the same, but the parameter configuration signals, the synchronization signals, and the control signals may not synchronize with each other.

In some embodiments, the parameter configuration signals, the synchronization signals, and the control signals may be transmitted from a same device (e.g., the control module 420 in the processing device 130). In some embodiments, the parameter configuration signals, the synchronization signals, and the control signals may be transmitted from different devices. For example, the parameter configuration signals may be transmitted from the control module 420 in the processing device 130, the synchronization signals may be transmitted from a controller in the image capture device 110, and the control signals may be transmitted from a controller in the infrared light source 120.

Merely by way of example, the exposure signals synchronize with the control signals. In this embodiments, the image data obtaining module 410 may obtain, from the image capture device 110, the first color image data generated during an interval from signal 701 to signal 713. The image capture device 110 may transmit the first color image data to the processing device 130 (e.g., the image data obtaining module 410) when receiving signal 713. The image data obtaining module 410 may obtain, from the image capture device 110, the first luminance image data generated during an interval from signal 703 to signal 715. The image capture device 110 may transmit the first luminance image data to the processing device 130 (e.g., the image data obtaining module 410) when receiving signal 715. The image fusion module 440 may generate the first enhanced image based on the first color image data and the first luminance image data.

Before the infrared light source 120 receives signal 705, the parameter determination module 450 may determine the first exposure parameter based on the first color image data and/or the first enhanced image. When receiving signal 723, the parameter configuration module 460 may start to configure the image capture device 110 based on the first exposure parameter. The parameter configuration module 460 may complete the configuration at the same time when the infrared light source 120 receives signal 705. The image capture device 110 may generate second color image data based on the first exposure parameter during an interval from signal 705 to signal 717. The image capture device 110 may transmit the second color image data to the processing device 130 (e.g., the image data obtaining module 410) when receiving signal 717. Before the infrared light source 120 receives signal 707, the parameter determination module 450 may determine the second exposure parameter based on the first luminance image data and/or the first enhanced image. When receiving signal 725, the parameter configuration module 460 may start to configure the image capture device 110 based on the second exposure parameter. The parameter configuration module 460 may complete the configuration at the same time when the infrared light source 120 receives signal 707. The image capture device 110 may generate second luminance image data based on the second exposure parameter during an interval from signal 707 to signal 719. The image capture device 110 may transmit the second luminance image data to the processing device 130 (e.g., the image data obtaining module 410) when receiving signal 719. The image fusion module 440 may generate a second enhanced image based on the second color image data and the second luminance image data.

During an interval from signal 711 to signal 701, an interval from signal 713 to signal 703, an interval from signal 715 to signal 705, an interval from signal 717 to signal 707, and an interval from signal 719 to signal 709, the image capture device 110 may be prepared for exposuring and generate no image data.

Merely by way of example, the exposure signals synchronize with the synchronization signals. In this embodiments, the image data obtaining module 410 may obtain, from the image capture device 110, the first color image data generated during an interval from signal 701 to signal 703. The image data obtaining module 410 may obtain, from the image capture device 110, the first luminance image data generated during an interval from signal 711 to signal 701 and an interval from signal 703 to signal 715. The image capture device 110 may transmit the image data obtained from signal 711 to signal 713 (e.g., a part of the first luminance image data obtained from signal 711 to signal 701 and a part of the first color image data obtained from signal 701 to signal 713) to the processing device 130 (e.g., the image data obtaining module 410) when receiving signal 713. The image capture device 110 may transmit the image data obtained from signal 713 to signal 715 (e.g., a part of the first luminance image data obtained from signal 703 to signal 715 and a part of the first color image data obtained from signal 713 to signal 703) to the processing device 130 (e.g., the image data obtaining module 410) when receiving signal 715. The image fusion module 440 may generate the first enhanced image based on the first color image data and the first luminance image data.

Before the infrared light source 120 receives signal 705, the parameter determination module 450 may determine the first exposure parameter based on the first color image data and/or the first enhanced image. When receiving signal 723, the parameter configuration module 460 may start to configure the image capture device 110 based on the first exposure parameter. The parameter configuration module 460 may complete the configuration at the same time when the infrared light source 120 receives signal 705. The image capture device 110 may generate second color image data based on the first exposure parameter during an interval from signal 705 to signal 707. Before the infrared light source 120 receives signal 707, the parameter determination module 450 may determine the second exposure parameter based on the first luminance image data and/or the first enhanced image. When receiving signal 725, the parameter configuration module 460 may start to configure the image capture device 110 based on the second exposure parameter. The parameter configuration module 460 may complete the configuration at the same time when the infrared light source 120 receives signal 707. The image capture device 110 may generate a part of second luminance image data based on the second exposure parameter during an interval from signal 707 to signal 719, and generate another part of the second luminance image data during an interval from signal 715 to signal 705. The image capture device 110 may transmit the image data obtained from signal 715 to signal 717 (e.g., a part of the second color image data obtained from signal 715 to signal 705 and a part of the second luminance image data obtained from signal 705 to signal 717) to the processing device 130 (e.g., the image data obtaining module 410) when receiving signal 717. The image capture device 110 may transmit the image data obtained from signal 717 to signal 719 (e.g., a part of the second color image data obtained from signal 717 to signal 707 and a part of the second luminance image data obtained from signal 707 to signal 719) to the processing device 130 (e.g., the image data obtaining module 410) when receiving signal 719. The image fusion module 440 may generate a second enhanced image based on the second color image data and the second luminance image data.

In some embodiments, there may be a first interval (very short, e.g., 10-20 ms) between the time when signals (e.g., the control signals, the synchronization signals, or the exposure signals) are transmitted and the time when the signals are received. There may be a second interval (very short, e.g., 10-20 ms) between the time when the signals are received and the time when a device is initiated (e.g., the time when the infrared light source 120 is turned on or turned off, the time when the sensor starts to generate electronic signals, or the time when the image capture device 110 starts to transmit the image data to the processing device 130) based on the received signals. For brevity, in the present disclosure, the first interval and/or the second interval may be omitted. For example, the time when the control signals are transmitted may be supposed to be equal to the time when the control signals are received and the time when the infrared light source 120 is initiated (e.g., turned on or turned off). It should be noted that the above assumption is merely provided for the purposes of illustration, and not intended to limit the scope of the present disclosure. In some embodiments, the first interval and/or the second interval may be considered in the process 500 and/or the process 600 in the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. An image capture system, comprising:
   an image capture device;
   an infrared light source configured to emit infrared light;
   at least one storage device including a set of instructions;
   at least one processor in communication with the at least one storage device, wherein when executing the set of instructions, the at least one processor is directed to cause the system to:
     obtain first color image data including color information, wherein the first color image data is generated by the image capture device with the infrared light source off;
     obtain first luminance image data including luminance information, wherein the first luminance image data is generated by the image capture device with the infrared light source on;
     generate a first enhanced image based on the first color image data and the first luminance image data;
     determine a first exposure parameter of the image capture device based on the first color image data or the first enhanced image; and
     determine a second exposure parameter of the image capture device based on the first luminance image data or the first enhanced image.

2. The system of claim 1, wherein when executing the set of instructions, the at least one processor is further directed to cause the system to:
   perform at least one of the following operations to the first color image data or the first luminance image data:
     adjusting white balance,
     color correction,
     image denoising, or
     image sharpening.

3. The system of claim 1, wherein when executing the set of instructions, the at least one processor is further directed to cause the system to:
   obtain second color image data, wherein the second color image data is generated by the image capture device using the first exposure parameter with the infrared light source off;
   obtain second luminance image data, wherein the second luminance image data is generated by the image capture device using the second exposure parameter with the infrared light source on; and
   generate a second enhanced image based on the second color image data and the second luminance image data.

4. The system of claim 1, wherein the first exposure parameter or the second exposure parameter includes at least one of a shutter speed, an f-number, sensibility, or a gain level.

5. The system of claim 1, wherein to generate the first enhanced image based on the first color image data and the first luminance image data, the at least one processor is directed to cause the system to:
   determine luminance data and chrominance data based on the first color image data;
   determine luminance enhancement data based on the first luminance image data and the luminance data; and
   generate the first enhanced image based on the luminance enhancement data and the chrominance data.

6. The system of claim 1, wherein the image capture device includes a sensor that is sensitive to visible light and the infrared light.

7. The system of claim 6, wherein the image capture device further includes a double pass filter that allows infrared light with specific wavelengths and the visible light to pass through.

8. The system of claim 7, wherein the double pass filter allows infrared light with wavelengths 840-860 nm and the visible light to pass through.

9. An image capture method implemented on a computing device having at least one storage device and at least one processor, the method comprising:
   obtaining first color image data including color information, wherein the first color image data is generated by an image capture device with an infrared light source off;
   obtaining first luminance image data including luminance information, wherein the first luminance image data is generated by the image capture device with the infrared light source on;
   generating a first enhanced image based on the first color image data and the first luminance image data;
   determining a first exposure parameter of the image capture device based on the first color image data or the first enhanced image; and
   determining a second exposure parameter of the image capture device based on the first luminance image data or the first enhanced image.

10. The method of claim 9, further comprising:
    performing at least one of the following operations to the first color image data or the first luminance image data:
      adjusting white balance,
      color correction,
      image denoising, or
      image sharpening.

11. The method of claim 9, further comprising:
    obtaining second color image data, wherein the second color image data is generated by the image capture device using the first exposure parameter with the infrared light source off;
    obtaining second luminance image data, wherein the second luminance image data is generated by the image capture device using the second exposure parameter with the infrared light source on; and
    generating a second enhanced image based on the second color image data and the second luminance image data.

12. The method of claim 9, wherein the first exposure parameter or the second exposure parameter includes at least one of a shutter speed, an f-number, sensibility, or a gain level.

13. The method of claim 9, wherein the generating of the first enhanced image based on the first color image data and the first luminance image data includes:
    determining luminance data and chrominance data based on the first color image data;
    determining luminance enhancement data based on the first luminance image data and the luminance data; and generating the first enhanced image based on the luminance enhancement data and the chrominance data.

14. The method of claim 9, wherein the image capture device includes a sensor that is sensitive to visible light and the infrared light.

15. The method of claim 14, wherein the image capture device further includes a double pass filter that allows infrared light with specific wavelengths and the visible light to pass through.

16. The method of claim 15, wherein the double pass filter allows infrared light with wavelengths 840-860 nm and the visible light to pass through.

17. A non-transitory computer readable medium comprising executable instructions that, when executed by at least one processor of an electronic device, cause the at least one processor to effectuate a method comprising:
    obtaining first color image data including color information, wherein the first color image data is generated by an image capture device with an infrared light source off;
    obtaining first luminance image data including luminance information, wherein the first luminance image data is generated by the image capture device with the infrared light source on;
    generating a first enhanced image based on the first color image data and the first luminance image data;
    determining a first exposure parameter of the image capture device based on the first color image data or the first enhanced image; and
    determining a second exposure parameter of the image capture device based on the first luminance image data or the first enhanced image.

* * * * *